United States Patent
Reese et al.

(10) Patent No.: US 9,035,105 B2
(45) Date of Patent: May 19, 2015

(54) PROCESS FOR THE IN SITU PRODUCTION OF POLYETHER POLYOLS BASED ON RENEWABLE MATERIALS AND THEIR USE IN THE PRODUCTION OF FLEXIBLE POLYURETHANE FOAMS

(75) Inventors: Jack R. Reese, Hurricane, WV (US); Stanley L. Hager, Cross Lanes, WV (US); Micah Moore, Red House, WV (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 76 days.

(21) Appl. No.: 13/553,996

(22) Filed: Jul. 20, 2012

(65) Prior Publication Data
US 2014/0024733 A1    Jan. 23, 2014

(51) Int. Cl.
| | |
|---|---|
| *C07C 43/00* | (2006.01) |
| *C08G 18/32* | (2006.01) |
| *C08G 18/48* | (2006.01) |
| *C08G 65/26* | (2006.01) |
| *C08G 18/66* | (2006.01) |
| *C08G 18/76* | (2006.01) |
| *C08G 18/36* | (2006.01) |
| *C08G 101/00* | (2006.01) |

(52) U.S. Cl.
CPC ............ *C08G 18/32* (2013.01); *C08G 18/4833* (2013.01); *C08G 18/4891* (2013.01); *C08G 65/26* (2013.01); *C08G 65/2609* (2013.01); *C08G 65/2663* (2013.01); *C08G 65/2696* (2013.01); *C08G 2101/0008* (2013.01); *C08G 2101/0016* (2013.01); *C08G 2101/0025* (2013.01); *C08G 18/485* (2013.01); *C08G 18/6696* (2013.01); *C08G 18/7621* (2013.01); *C08G 18/36* (2013.01); *C08G 2101/00* (2013.01); *C08G 2101/0083* (2013.01)

(58) Field of Classification Search
CPC ............ C08G 65/26; C08G 65/2609; C08G 65/2663; C08G 65/2696; C08G 2101/0008; C08G 2101/0016; C08G 2101/0025
USPC ................ 568/606, 613, 619, 620, 623, 625; 521/155, 174
See application file for complete search history.

(56) References Cited

U.S. PATENT DOCUMENTS

| | | |
|---|---|---|
| 5,470,813 A | 11/1995 | Le-Khac |
| 5,482,908 A | 1/1996 | Le-Khac |
| 5,545,601 A | 8/1996 | Le-Khac |
| 7,700,661 B2 | 4/2010 | Griggs |
| 2006/0167125 A1 | 7/2006 | Bauer et al. |
| 2006/0229375 A1* | 10/2006 | Hsiao et al. .................. 521/172 |
| 2007/0225394 A1 | 9/2007 | Ostrowski et al. |
| 2007/0238798 A1 | 10/2007 | McDaniel et al. |
| 2010/0160469 A1 | 6/2010 | Adkins et al. |
| 2010/0197878 A1 | 8/2010 | Casati et al. |
| 2010/0298460 A1* | 11/2010 | Mijolovic et al. ............. 521/174 |
| 2011/0039968 A1 | 2/2011 | Vairo |
| 2011/0054060 A1 | 3/2011 | Casati et al. |
| 2011/0190408 A1 | 8/2011 | Casati et al. |
| 2011/0230581 A1 | 9/2011 | Klescewski et al. |
| 2012/0016048 A1 | 1/2012 | Hager et al. |

FOREIGN PATENT DOCUMENTS

JP      2011208059 A      10/2011

OTHER PUBLICATIONS

J.H. Saunders and K.C. Frisch, Polyurethanes Chemistry and Technology II, Technology Part II (High Polymers vol. XVI), Interscience Publishers, 1964, pp. 32-37.

Ionescu, Mihail, Chemistry and Technology of Polyols for Polyurethanes, Rapra Technology Limited, 2005, Chapter 17, pp. 435-470.

* cited by examiner

*Primary Examiner* — Michael L Leonard
(74) *Attorney, Agent, or Firm* — Donald R. Palladino; Robert S. Klemz; Lyndanne M. Whalen

(57) ABSTRACT

A polyether polyol based on renewable materials is obtained by the in situ production of a polyether from a hydroxyl group-containing vegetable oil, at least one alkylene oxide and a low molecular weight polyol having at least 2 hydroxyl groups. The polyol is produced by introducing the hydroxyl group-containing vegetable oil, a catalyst and an alkylene oxide to a reactor and initiating the alkoxylation reaction. After the alkoxylation reaction has begun but before the reaction has been 20% completed, the low molecular weight polyol having at least 2 hydroxyl groups is continuously introduced into the reactor. After the in situ made polyether polyol product having the desired molecular weight has been formed, the in situ made polyether polyol is removed from the reactor. These polyether polyols are particularly suitable for the production of flexible polyurethane foams.

15 Claims, No Drawings

PROCESS FOR THE IN SITU PRODUCTION OF POLYETHER POLYOLS BASED ON RENEWABLE MATERIALS AND THEIR USE IN THE PRODUCTION OF FLEXIBLE POLYURETHANE FOAMS

FIELD OF THE INVENTION

The present invention relates in general to polyols useful for the production of polyurethanes, and more specifically, the production of flexible polyurethane foams, preferably, flexible, free-rise or slabstock polyurethane foams. These polyether polyols are produced by reacting an alkylene oxide, a low molecular weight polyol and a hydroxyl group-containing vegetable oil in the presence of an alkoxylation catalyst.

As used herein, a "hydroxyl group-containing vegetable oil" is any fatty acid triglyceride derived from hydroxylated vegetable, animal or other natural sources having at least one hydroxyl group, preferably, from 2 to 6 hydroxyl groups, capable of being alkoxylated.

BACKGROUND OF THE INVENTION

Polyurethane foams have found extensive use in a multitude of industrial and consumer applications. This popularity is due to polyurethane's wide ranging mechanical properties and the excellent cushioning performance of the foamed product and its ability for the foam to be relatively easily manufactured. Furniture and mattresses, for example, rely on the durability and cushioning performance of polyurethane foams to provide comfort and support over years of use. Automobiles also, contain numerous polyurethane foam components, such as seats, trim and other interior parts. Polyurethane foams have traditionally been categorized as being flexible, semi-rigid or rigid foams. Flexible foams are generally softer, less dense, more pliable and more subject to structural rebound subsequent loading than are rigid foams.

The production of polyurethane foams is well known to those skilled in the art. Polyurethanes are formed from the reaction of NCO groups with hydroxyl groups. The most common method for the production of polyurethanes is reaction of a polyol and an isocyanate which forms the backbone urethane group. Cross linking agents, blowing agents, catalysts and other additives may also be included in the polyurethane formulation as needed.

Polyols used in the production of polyurethanes have typically been petrochemical in origin, being generally derived from propylene oxide, ethylene oxide and various starters such as ethylene glycol, propylene glycol, glycerin, sucrose and sorbitol. Polyester polyols and polyether polyols are the most common polyols used in polyurethane production. For semi-rigid foams, polyester or polyether polyols with molecular weights of from about 300 to 2,000 are generally used. For flexible foams, longer chain polyols with molecular weights of from about 1,000 to 10,000 are typically used. Polyester and polyether polyols can be selected to allow the engineering of a particular polyurethane elastomer or foam having desired final toughness, durability, density, flexibility, compression set ratios and modulus and hardness qualities. Generally, higher molecular weight polyols and lower functionality polyols tend to produce more flexible foams than do lower molecular weight polyols and higher functionality polyols.

Petroleum-derived components such as polyester and polyether polyols pose several disadvantages. Use of such polyester or polyether polyols contributes to the depletion of oil, which is a non-renewable resource. Also, the production of a polyol requires the investment of a great deal of energy because the oil to make the polyol must be drilled, extracted and transported to a refinery where it is refined and processed to yield the finished polyol. As the consuming public becomes increasingly aware of the environmental impact of this production chain, consumer demand for "greener" products will continue to grow. To help reduce the depletion of oil while satisfying this increasing consumer demand, it would be advantageous to partially or wholly replace petroleum-derived polyester or polyether polyols used in the production of polyurethane elastomers and foams with more versatile, renewable and more environmentally responsible components.

One approach taken to address these concerns is the replacement of at least some percentage of the petroleum-based polyols with polyols derived from renewable resources. Unfortunately, the use of the petroleum-based products is a highly developed industry and years of optimization have created products tailored to meet strict industry requirements. Thus, the attempted substitution of products based on renewable resources has been constrained by several factors including the difficulty of developing "drop in" type products which can be added without significantly affecting the processing characteristics and without substantial loss of product quality. For example, although castor oil-based polyurethanes have been known for decades, their use has generally been limited to a few applications such as hydrophobic coatings and certain sealants where the typical polyurethane properties are not required. There is a continuing need to develop polyethers based on these natural products which can meet industry requirements for foam quality and processability.

The patent and technical literature includes many disclosures in which the use of either castor oil or castor polyols is discussed. (See J. H. Saunders and K. C. Frisch, Polyurethanes Chemistry and Technology II. Technology Part II (High Polymers Vol. XVI), Interscience Publishers, 1964, pages 32-37 and M. Ionescu, Chemistry and Technology of Polyols for Polyurethanes, Rapra Technology Limited, 2005, Chapter 17, pages 435-470. See also published U.S. Patent Application 2007/0238798 and WO 2004/020497). However, production of foam articles that meet the foam processing and property requirements of petroleum based polyols using only a castor oil-based polyol has not yet been achieved.

One approach which has been taken to utilize vegetable oil-based polyols in an effort to reduce the amount of petroleum-based polyols used to produce polyurethanes is use of a polyol component that includes both a petroleum-based polyol and a polyol derived from a renewable resource. See, e.g., U.S. Pat. No. 7,700,661B2, published U.S. Patent Application 2010/0197878A1 and published U.S. Patent Application 2011/0054060A1.

This approach, however, requires more equipment for storage of the individual polyols, blending of the polyols in the required ratio, and storage of the blend prior to use. This approach also requires additional processing steps in the preparation of a suitable polyol blend.

It would therefore be advantageous to develop a polyol derived from a renewable resource that could be used to produce a useful polyurethane foam which could be used without the need to physically blend that polyol derived from a renewable resource with a petroleum-derived polyol.

SUMMARY OF THE INVENTION

Accordingly, the present invention provides a polyether polyol based on renewable resources that need not be physically blended with a petroleum-based polyol before being used to produce a polyurethane foam. These polyether polyols are produced by the process described in greater detail below.

The present invention also provides a process for the in situ production of a polyether polyol from a hydroxylated vegetable oil, an alkylene oxide and a low molecular weight polyol.

The present invention additionally provides a process for the production of a polyurethane foam using the polyether polyol of the present invention.

The present invention further provides polyurethane foams having physical properties which are comparable to or better than the physical properties of foams produced with a polyol component made up of a physical blend of a polyol derived from a renewable resource and a petroleum-based polyol produced by the above-described process.

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages, hydroxyl (OH) numbers, functionalities and so forth in the specification are to be understood as being modified in all instances by the term "about." Equivalent weights and molecular weights given herein in Daltons (Da) are number average equivalent weights and number average molecular weights respectively, unless indicated otherwise.

The present invention provides a polyether polyol based on a renewable resource which need not be blended with a petroleum-based polyol prior to use in the production of a polyurethane and a process for the production of such a polyether polyol.

The polyether polyols of the present invention are produced in situ by a process in which a hydroxylated vegetable oil, an alkylene oxide and a low molecular weight polyol are reacted in a single reactor. In this process, a polyether from a hydroxyl group-containing vegetable oil, at least one alkylene oxide and a low molecular weight polyol having at least 2 hydroxyl groups are reacted in the presence of a catalyst. In this process, the hydroxyl group-containing vegetable oil is introduced into a reactor. At least one alkylene oxide is introduced into the vegetable oil. The hydroxyl group-containing vegetable oil and alkylene oxide may be combined prior to their introduction into the reactor or they may be simultaneously introduced into the reactor or the hydroxyl group-containing vegetable oil may be introduced into the reactor before addition of the alkylene oxide. The reaction of the hydroxylated vegetable oil and alkylene oxide(s) in the presence of a catalyst is initiated. Before this alkoxylation reaction is 20% complete, continuous introduction of the low molecular weight polyol having at least 2 hydroxyl groups into the reactor is begun. After the in situ made polyether polyol product having the desired molecular weight has been formed, that in situ made polyether polyol is removed from the reactor.

The present invention is also directed to a process for the production of polyurethane foams using the polyether polyol of the present invention. The polyurethane foams of the present invention are produced by reacting a polyether polyol produced in situ from a hydroxyl group-containing vegetable oil in accordance with the present invention with a polyisocyanate, optionally, in the presence of a blowing agent at an NCO/OH Index of from 80 to 125. The required polyether polyol derived from a hydroxyl group-containing vegetable oil is produced by introducing the hydroxyl group-containing vegetable oil into a reactor. At least one alkylene oxide is introduced into the vegetable oil either before the vegetable oil is introduced into the reactor or the alkylene oxide is introduced into the reactor by addition simultaneously with the vegetable oil or subsequent to introduction of the vegetable oil into the reactor A catalyst is generally used to promote the alkoxylation reaction. The catalyst may be introduced into the reactor as a separate stream or it may be introduced in combination with either the vegetable oil or the alkylene oxide. The reaction of the hydroxylated vegetable oil and alkylene oxide(s) is initiated. Before this reaction is 20% complete, continuous introduction of the low molecular weight polyol having at least 2 hydroxyl groups into the reactor is begun. After the in situ made polyether polyol product having the desired molecular weight has been formed, that in situ made polyether polyol is removed from the reactor.

The polyurethane foams of the present invention have physical properties which are comparable to or better than the physical properties of foams produced with a polyol component made up of a physical blend of a polyol derived from a renewable resource and a petroleum-based polyol produced by techniques known to those skilled in the art.

The polyether polyol of the present invention is formed by an in situ production process in which a hydroxyl group-containing vegetable oil, at least one alkylene oxide and a low molecular weight polyol having at least 2 hydroxyl groups are reacted in the presence of a catalyst in a single reactor. In the process used to produce the polyether polyols of the present invention, the total amount of the hydroxyl group-containing vegetable oil is first introduced into the reactor. The catalyst used to promote this alkoxylation reaction is introduced into the reactor in which appropriate reaction conditions are maintained. The alkylene oxide(s) are then introduced into the reactor containing the hydroxylated vegetable oil and the alkoxylation reaction is then initiated. After the alkoxylation of the hydroxylated vegetable oil has begun but before the reaction has been 20% completed, at least one low molecular weight polyol having at least 2 hydroxyl groups is introduced into the reactor and the reaction mixture on a continuous basis. After the in situ made polyether polyol product having the desired molecular weight has been formed, that in situ made polyether polyol is removed from the reactor.

The polyurethane foams of the present invention are the reaction products of at least one polyisocyanate and the polyether polyol based on a renewable resource of the present invention. These foams are optionally produced in the presence of at least one of blowing agents, surfactants, pigments, flame retardants, catalysts and fillers.

The present invention further provides a process for making a polyurethane foam by reacting at least one polyisocyanate and at least one polyether polyol based on a renewable resource of the present invention optionally in the presence of at least one of blowing agents, surfactants, pigments, flame retardants, catalysts and fillers.

The vegetable oil-based polyol of the present invention can completely replace the petroleum-derived polyol(s) that would typically be used in producing a polyurethane foam. In addition, the vegetable oil-based polyols of the present invention can be employed in the foam forming process without appreciably altering the foam formulation.

The preferred vegetable oil used to produce the polyether polyol of the present invention is castor oil. However, any vegetable oil having at least one hydroxyl group capable of being alkoxylated, preferably at least 2 hydroxyl groups, most preferably, at least 3 hydroxyl groups may be used. Examples of suitable vegetable oils include: castor oil, cashew nutshell oil, lesquerella oil, hydroxylated soybean oil, hydroxylated palm oil, hydroxylated sunflower oil, hydroxylated canola, hydroxylated linseed oil, hydroxylated cottonseed oil, hydroxylated tung oil, hydroxylated poppy seed oil, hydroxylated corn oil and hydroxylated peanut oil. Other fatty acid triglycerides derived from animal or other natural sources capable of being hydroxylated for alkoxylation are also suitable compositions for use in accordance with the present invention and are within the scope of the present invention.

The alkylene oxides useful in alkoxylating the hydroxyl group-containing vegetable oil include, but are not limited to, ethylene oxide, propylene oxide, 1,2- and 2,3-butylene oxide, isobutylene oxide, epichlorohydrin, cyclohexene oxide, styrene oxide, the higher alkylene oxides such as the $C_5$-$C_{30}$ α-alkylene oxides; polycarboxylic anhydrides; and lactones. It is generally undesirable to employ ethylene oxide alone, but mixtures of propylene oxide and ethylene oxide with high ethylene oxide content, i.e. up to 85 mole percent, may be used effectively. Propylene oxide or mixtures of propylene oxide with ethylene oxide or another alkylene oxide are particularly preferred for alkoxylating the vegetable oil.

In the preferred method for preparing the polyether polyols of the present invention, the total amount of the hydroxylated vegetable oil is first introduced into the reactor. The total amount of catalyst is then preferably introduced into the vegetable oil-containing reactor. Introduction of the alkylene oxide is then begun. During introduction of the alkylene oxide into the reactor containing the vegetable oil, at some point before the alkoxylation reaction has reached 20% completion, a low molecular weight polyol having a hydroxy functionality of at least 2 is continuously and gradually introduced into the vegetable oil-containing reactor. Introduction of this low molecular weight polyol must be begun after the alkoxylation reaction has been begun but before the alkoxylation reaction has reached 20% completion, preferably, before it has reached 15% completion, most preferably, before it has reached 12% completion.

Generally, the low molecular weight polyol is introduced into the reactor at a defined ratio to the oxide feed to provide the targeted final hydroxyl number and desired amount of renewable content of the in situ made polyether product. The ratio may remain constant or vary throughout the oxide feed to give the desired product molecular weight and molecular weight distribution. The ratio may vary in a linear or non-linear manner.

The amount of the low molecular weight polyol having a hydroxy functionality of at least two will generally range from about 0.2% to about 3%, preferably, from about 0.7% to about 2.3%, most preferably, from about 1.2% to about 1.8%, based on the final in situ made polyether product weight.

Suitable low molecular weight polyols having a hydroxy functionality of at least 2 will generally have a molecular weight of less than 250 Da, preferably less than 200 Da, most preferably less than 100 Da and have a hydroxy functionality of at least 2, preferably, from 2 to 8, most preferably, from 2 to 6.

Examples of suitable low molecular weight polyols include: propylene glycol, glycerin, sorbitol, sucrose, diglycerol, trimethylolpropane, pentaerythritol and mixtures thereof. Glycerin and propylene glycol are particularly preferred.

The alkylene oxides employed in producing the alkoxylated vegetable oil of the present invention must be used in amounts such that (i) the alkoxylation product will have an ethylene oxide content in the alkoxylated segment of greater than 2% by weight, preferably, greater than 5% by weight, most preferably, from 10 to 20%.

The alkoxylated vegetable oil-based polyols may optionally be "capped" with ethylene oxide, as known in the art and disclosed e.g., in U.S. Pat. Nos. 4,355,188; 4,721,818; and 5,563,221.

The relative amount of hydroxylated vegetable oil to low molecular weight polyol may range from 5 mole equivalents of hydroxylated vegetable oil per 95 mole equivalents of low molecular weight polyol with a functionality of 2 to 95 mole equivalents of hydroxylated vegetable oil per 5 mole equivalents of low molecular weight polyol having a functionality of at least 2, preferably, from 20 mole equivalents of hydroxylated vegetable oil per 80 mole equivalents of low molecular weight polyol with a functionality of at least 2 to 80 mole equivalents of hydroxylated vegetable oil per 20 mole equivalents of low molecular weight polyol having a functionality of at least 2.

The vegetable oil may be alkoxylated in the presence of any of the known catalysts suitable for use in an alkoxylation process. It is preferred, however, that the alkoxylation reaction be conducted with a double metal cyanide (DMC) catalyst. Any double metal cyanide (DMC) catalyst may be used.

Suitable double metal cyanide (DMC) catalysts are known to those skilled in the art. Double metal cyanide complex (DMC) catalysts are non-stoichiometric complexes of a low molecular weight organic complexing agent and optionally other complexing agents with a double metal cyanide salt, e.g., zinc hexacyanocobaltate.

Exemplary double metal cyanide (DMC) complex catalysts for use in alkoxylating the vegetable oil include those suitable for preparation of low unsaturation polyoxyalkylene polyether polyols, such as disclosed in U.S. Pat. Nos. 3,427,256; 3,427,334; 3,427,335; 3,829,505; 4,472,560; 4,477,589; and 5,158,922. The double metal cyanide (DMC) catalysts more preferred are those capable of preparing "ultra-low" unsaturation polyether polyols. Such catalysts are disclosed in U.S. Pat. Nos. 5,470,813; 5,482,908, and 5,545,601, the entire contents of which are herein incorporated by reference. Particularly preferred catalysts are those zinc hexacyanocobaltate catalysts prepared by the methods described in U.S. Pat. No. 5,482,908.

The DMC catalyst concentration is chosen to ensure a good control of the polyoxyalkylation reaction under the given reaction conditions. The catalyst concentration is preferably in the range from 0.0005 wt. % to 1 wt. %, more preferably in the range from 0.001 wt. % to 0.1 wt. %, most preferably in the range from 0.001 to 0.01 wt. %, based on the amount of polyol to be produced. The DMC catalyst may be in an amount ranging between any combination of these values, inclusive of the recited values.

The process for the in situ preparation of the polyols of the present invention is preferably a semi-batch process. However, the process may also be conducted on a continuous basis with the vegetable oil, alkylene oxide, low molecular weight polyol and catalyst all being fed into the reactor continuously.

When the catalyst used to alkoxylate the vegetable oil is a DMC catalyst, a semi-batch process such as that disclosed in U.S. Pat. No. 5,689,012 is preferably employed. In the semi-batch process, the entire amount of the vegetable oil to be alkoxylated is introduced into the reactor with the catalyst before any alkylene oxide or low molecular weight polyol is introduced. Optionally, an acid (e.g., phosphoric acid) can be added to the vegetable oil in the amount of 10 to 250 ppm depending on the quality of vegetable to assist in neutralizing any contaminants prior to alkoxylation. Addition of the alkylene oxide is then begun and subsequent to the initiation of the alkoxylation reaction but before that alkoxylation reaction has reached 20% completion, addition of the low molecular weight polyol is begun. The product polyol is removed from the reactor after the desired molecular weight has been reached.

Reactors for conducting semi-batch processes are known and may utilize a range of mixing conditions with energy inputs from 0.5 to 20 horsepower per 1,000 gal. Mixing energies of from 1 to 8 horsepower per 1,000 gal. are particularly useful. Those skilled in the art will appreciate that the optimum energy input may vary with process parameters such oxide addition time and with product viscosity, e.g., a greater amount of energy may be preferred for products with higher viscosities. Other process conditions, which may be useful, include purging the reactor oxide-feed tube or pipe with nitrogen or another inert fluid or gas after completion of the oxide feed.

The vegetable oil-based polyols of the present invention preferably have a nominal functionality in the range of 1.5 to 6, more preferably 2 to 4 and a molecular weight in the range of 700 to 8,000, most preferably from 1000 to 5000 Da. The vegetable oil-based polyols useful in making the flexible foams of the present invention may have a functionality and molecular weight in an amount ranging between any combination of these values, inclusive of the recited values.

Suitable polyisocyanates are known to those skilled in the art and include unmodified isocyanates, modified polyisocyanates, and isocyanate prepolymers. Such organic polyisocyanates include aliphatic, cycloaliphatic, araliphatic, aromatic, and heterocyclic polyisocyanates of the type described, for example, by W. Siefken in Justus Liebigs Annalen der Chemie, 562, pages 75 to 136. Examples of such isocyanates include those represented by the formula,

in which n is a number from 2-5, preferably 2-3, and Q is an aliphatic hydrocarbon group containing 2-18, preferably 6-10, carbon atoms; a cycloaliphatic hydrocarbon group containing 4-15, preferably 5-10, carbon atoms; an araliphatic hydrocarbon group containing 8-15, preferably 8-13, carbon atoms; or an aromatic hydrocarbon group containing 6-15, preferably 6-13, carbon atoms.

Examples of suitable isocyanates include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate, and mixtures of these isomers; 1-isocyanato-3,3,5-trimethyl-5-isocyanatoniethylcyclohexane (isophorone diisocyanate), 2,4- and 2,6-hexahydrotoluene diisocyanate and mixtures of these isomers; dicyclohexylmethane-4,4'-diisocyanate (hydrogenated MDI, or HMDI); 1,3- and 1,4-phenylene diisocyanate; 2,4- and 2,6-toluene diisocyanate and mixtures of these isomers (TDI); diphenylmethane-2,4'- and/or -4,4'-diisocyanate (MDI); naphthylene-1,5-diisocyanate; triphenylmethane-4,4',4"-triisocyanate; polyphenyl-polymethylene-polyisocyanates of the type which may be obtained by condensing aniline with formaldehyde, followed by phosgenation (crude MDI); norbornane diisocyanates; m- and p-isocyanatophenyl sulfonylisocyanates; perchlorinated aryl polyisocyanates; modified polyisocyanates containing carbodiimide groups; modified polyisocyanates containing urethane groups; modified polyisocyanates containing allophanate groups; modified polyisocyanates containing isocyanurate groups; modified polyisocyanates containing urea groups; polyisocyanates containing biuret groups; polyisocyanates obtained by telomerization reactions; polyisocyanates containing ester groups; reaction products of the above-mentioned isocyanates with acetals; and polyisocyanates containing polymeric fatty acid groups. It is also possible to use the isocyanate-containing distillation residues accumulating in the production of isocyanates on a commercial scale, optionally in solution in one or more of the polyisocyanates mentioned above. Those skilled in the art will recognize that it is also possible to use mixtures of the polyisocyanates described above.

In general, it is preferred to use readily available polyisocyanates, such as 2,4- and 2,6-toluene diisocyanates and mixtures of these isomers (TDI); polyphenyl-polymethylene-polyisocyanates of the type obtained by condensing aniline with formaldehyde, followed by phosgenation (crude MDI); and polyisocyanates containing carbodiimide groups, urethane groups, allophanate groups, isocyanurate groups, urea groups, or biuret groups (modified polyisocyanates).

Isocyanate-terminated prepolymers may also be employed in the preparation of the flexible foams of the present invention. Prepolymers may be prepared by reacting an excess of organic polyisocyanate or mixtures thereof with a minor amount of an active hydrogen-containing compound as determined by the well-known Zerewitinoff test, as described by Kohler in "Journal of the American Chemical Society," 49, 3181(1927). These compounds and their methods of preparation are well known to those skilled in the art. The use of any one specific active hydrogen compound is not critical; any such compound can be employed in the practice of the present invention.

The vegetable oil-based polyol of the present invention will generally be the only high molecular weight polyol (i.e., polyol with a molecular weight greater than 1000 Da) used to produce a polyurethane in accordance with the present invention. However, it would be possible to include one or more of the known non-vegetable oil-based (i.e., petrochemically derived) polyols such as polyethers, polyesters, polyacetals, polycarbonates, polyesterethers, polyester carbonates, polythioethers, polyamides, polyesteramides, polysiloxanes, polybutadienes and polyacetones in a polyurethane-forming reaction mixture. If any other high molecular weight polyol is included in the polyurethane-forming reaction mixture, it will not be included in an amount greater than 10%.

Suitable additives which may optionally be included in the polyurethane forming formulations of the present invention include, for example, foam stabilizers, catalysts, cell regulators, reaction inhibitors, flame retardants, plasticizers, pigments, fillers, etc.

Foam stabilizers which may be considered suitable for use in the inventive process include, for example, polyether siloxanes, and preferably those which are insoluble in water. Compounds such as these are generally of such a structure that copolymers of ethylene oxide and propylene oxide are attached to a polydimethylsiloxane residue. Such foam stabilizers are described in, for example, U.S. Pat. Nos. 2,834, 748, 2,917,480 and 3,629,308.

Catalysts suitable for the polyurethane production process of the present invention include any of those which are known in the art.

Catalysts suitable for the production of flexible foams include: tertiary amines, such as triethylamine, tributylamine, N-methylmorpholine, N-ethylmorpholine, N,N,N',N'-tetramethylethylenediamine, pentamethyl-diethylenetriamine and higher homologues (as described in, for example, DE-A 2,624,527 and 2,624,528), 1,4-diazabicyclo(2.2.2)octane, N-methyl-N'-dimethyl-aminoethylpiperazine, bis-(dimethylaminoalkyl)piperazines. N,N-dimethylbenzylamine, N,N- dimethylcyclohexylamine. N,N-diethyl-benzylamine, bis-(N,N-diethylaminoethyl) adipate. N,N,N',N'-tetramethyl-1,3-butanediamine, N,N-dimethyl-p-phenylethylamine, 1,2-dimethyl-imidazole, 2-methylimidazole, monocyclic and bicyclic amines together with bis-(dialkylamino)alkyl ethers, such as 2,2-bis-(dimethylaminoethyl)ether.

Other suitable catalysts suitable for the production of polyurethanes include organometallic compounds, and particularly, organotin compounds. Organotin compounds which may be considered suitable include those organotin compounds containing sulfur. Such catalysts include, for example, di-n-octyltin mercaptide. Other types of suitable organotin catalysts include, preferably tin(II) salts of carboxylic acids such as, for example, tin(II) acetate, tin(II) octoate, tin(II) ethylhexoate and/or tin(II) laurate, and tin(IV) compounds such as, for example, dibutyltin oxide, dibutyltin dichloride, dibutyltin diacetate, dibutyltin dilaurate, dibutyltin maleate and/or dioctyltin diacetate.

Further examples of suitable additives, which may optionally be included in the flexible polyurethane foams of the present invention can be found in Kunststoff-Handbuch, volume VII, edited by Vieweg & Hochtlen, Carl Hanser Verlag, Munich 1993, 3rd Ed., pp. 104 to 127, for example. The relevant details concerning the use and mode of action of these additives are set forth therein.

EXAMPLES

The present invention is further illustrated, but is not to be limited, by the following examples in which all quantities given in "parts" and "percents" are understood to be by weight, unless otherwise indicated.

Procedure for the Preparation of Castor Oil-Based Polyols in Accordance with the Present Invention Castor oil (3810 g) was charged to a reactor along with a double metal cyanide catalyst prepared according to the procedure in U.S. Pat. No. 5,482,908 (0.6 g). This mixture was heated to 130° C. with nitrogen stripping of the castor oil-catalyst blend. Propylene oxide (126 g) and ethylene oxide (26 g) were charged to activate the catalyst. After activation, the reactor temperature was maintained at 130° C. and introduction of ethylene oxide (ramp to 16.6 g/min) and propylene oxide (ramp to 79 g/min) was begun. After 33 minutes (12% of alkoxylation had been completed), glycerin (2.2 g/min) was introduced into the reactor. After 87% of the alkoxylation was completed the glycerin feed ended (275 g glycerin) and the propylene oxide and ethylene oxide continued until reaching their final weights (13155 g for PO and 2760 g for EO). The oxide was allowed to cookout at reaction temperature for 30 minutes. The final in situ made polyether product was stripped with nitrogen and vacuum before being discharged from the reactor.

The materials used to produce free rise flexible polyurethane foams in Examples 1-5 were as follows:

POLYOL A: A castor oil and glycerin initiated polyether having a hydroxyl number of about 56 mg KOH/g and ethylene oxide (EO) content of 13.8% which was produced according to the process described above using 60 ppm of DMC catalyst.

POLYOL B: A castor oil and glycerin initiated polyether having a hydroxyl number of about 56 mg KOH/g and ethylene oxide (EO) content of 13.8% which was produced according to the process described above using 30 ppm of DMC catalyst.

POLYOL C: A glycerin-initiated polyether polyol containing an EO/PO mixed block produced using DMC catalysis and having a hydroxyl number of about 56 mg KOH/g; an EO content=7.4%; and % primary OH groups=10%.

POLYOL D: A castor oil initiated polyether polyol having a hydroxyl number of 56 and a total EO content of 19.1% (28.6% EO in chain; 19.7% primary OH groups) which was prepared by charging castor oil (6914 g) to a reactor along with a double metal cyanide catalyst prepared according to the procedure disclosed in U.S. Pat. No. 5,482,908 (0.6-1.2 g). This mixture was heated to 130° C. with nitrogen stripping of the polyol/catalyst blend. Propylene oxide and/or ethylene oxide was charged to activate the catalyst. After activation, the reactor temperature was maintained at 130° C. and propylene oxide and ethylene oxide (ratio of 71/29) were added over a 2.5-4 hour period. After digestion at 130° C. for 0.5 hours, the polyether was stripped to remove any unreacted propylene oxide of ethylene oxide, cooled and discharged.

SURFACTANT a silicone surfactant available as NIAX L 635 from Momentive Performance Materials;

CATALYST A stannous octoate, available as DABCO T-9 from Air Products;

CATALYST B an amine catalyst available as NIAX C-183 from Momentive Performance Materials; and ISOCYANATE toluene diisocyanate, available as MONDUR TD-80 from Bayer MaterialScience.

The above-listed components were combined in the amounts (in parts) given below in Table I and reacted at an isocyanate index (100 A/B) of 110 to produce free-rise flexible foams.

The foams produced in Examples 1-5 were prepared by the following procedure:

All of the formulation components listed in Table 1 with the exception of the Dabco T-9 catalyst and the isocyanate component were added to a one-half gallon cylindrical container fitted with baffles. The contents were mixed at 2400 rpm for 60 seconds with an agitator having two turbine impellers. The mixture was then degassed for 15 seconds. Dabco T-9 catalyst, if used, was added at this time. After degassing, the contents were mixed at 2400 rpm for 15 seconds, during which period the isocyanate component was added with about 7 seconds of mixing remaining. The mixture was then poured into a 14×14×6-inch cardboard box, where it rose freely until the reaction was complete. A batch size sufficient to give a bun height of ~7.5 inches high was employed. The freshly prepared bun was cured for 5 minutes in an oven at 120° C. and then allowed to cure at ambient conditions for a minimum of 2 days. The cured buns were then trimmed to 12×12×4 inches using a band saw. These samples were then conditioned for at least 16 hours at standard temperature (~23° C.) and humidity (~50%) before testing for physical and mechanical properties. Physical properties of the resultant foams were determined in accordance with ASTM D 3574 procedures, except as noted, and are summarized below in Table I.

Air flow is reported as standard cubic feet per minute measured on 2×2×1" specimens using a AMSCOR Model 1377 Foam Porosity Instrument.

Compression set is reported as the percentage recovery of the deflected height after 90% compression ($C_d$)

HACS 75% is reported as the percentage recovery of the deflected height after 75% compression ($C_d$)

Wet Set 50% is reported as the percentage recovery of the original height after 50% compression ($C_t$). the method is described in U.S. Pat. No. 5,549,841.

TABLE I

|  | Ex. 1* | Ex. 2 | Ex. 3* | Ex. 4 | Ex. 5 |
|---|---|---|---|---|---|
| POLYOL A | 0 | 0 | 0 | 100 | 0 |
| POLYOL B | 0 | 0 | 0 | 0 | 100 |
| POLYOL C | 100 | 0 | 55 | 0 | 0 |
| POLYOL D | 0 | 100 | 45 | 0 | 0 |
| WATER | 4.2 | 4.2 | 4.2 | 4.2 | 4.2 |
| SURFACTANT | 1.2 | 1.2 | 1.2 | 1.2 | 1.2 |
| CATALYST A | 0.22 | 0.22 | 0.22 | 0.22 | 0.22 |
| CATALYST B | 0.15 | 0.15 | 0.15 | 0.15 | 0.15 |
| ISOCYANATE | 51.81 | 51.81 | 51.81 | 51.81 | 51.81 |
| Cream Time (secs) | 10 | 11 | 11 | 11 | 11 |
| Rise Time (secs) | 88 | 91.5 | 90.5 | 89 | 88 |
| Density (lb./ft.$^3$) | 1.53 | 1.56 | 1.56 | 1.56 | 1.55 |
| Resilience (%) | 37 | 38 | 37 | 38 | 40 |
| Air Flow (ft.$^3$/min) | 4.00 | 4.21 | 4.20 | 4.24 | 4.32 |
| IFD Height (in.) | 4.05 | 4.05 | 4.05 | 4.04 | 4.04 |
| IFD 25% (lb./50 in.$^2$) | 34 | 37 | 36 | 37 | 37 |
| IFD 65% (lb./50 in.$^2$) | 64 | 70 | 68 | 70 | 69 |
| IFD 25% Return (lb./50 in.$^2$) | 22 | 25 | 24 | 25 | 25 |
| Return Value @ 25% (%) | 66 | 66 | 65 | 67 | 68 |
| S.F. 65%/25% | 1.90 | 1.87 | 1.90 | 1.89 | 1.90 |
| Tensile Strength (psi) | 16.98 | 17.37 | 17.17 | 16.94 | 16.67 |
| Elongation (%) | 220.95 | 204.7 | 211.35 | 189.85 | 185.05 |
| Tear Strength (pli) | 2.60 | 2.33 | 2.38 | 2.44 | 2.33 |
| Comp. Set 90% | 5.72 | 4.37 | 4.15 | 3.61 | 4.08 |
| HACS 75% | 5.10 | 12.19 | 11.31 | 11.32 | 10.92 |
| Wet Set 50% | 4.71 | 3.75 | 4.37 | 3.96 | 3.62 |

*Comparative examples.

As is readily apparent by reference to Table I, the foams produced with the polyols of the present invention (Examples 4 and 5) exhibited slightly better resilience, IFD and IFD Return Value at 25% compared to the blended polyol (Example 3*) and glycerin initiated polyol (Example 1*).

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. A process for the in situ production of a polyether from a hydroxyl group-containing vegetable oil, at least one alkylene oxide and a low molecular weight polyol having at least 2 hydroxyl groups in the presence of a catalyst comprising:
    (a) introducing the hydroxyl group-containing vegetable oil, catalyst and alkylene oxide into a reactor,
    (b) initiating reaction of hydroxyl group-containing vegetable oil and the alkylene oxide,
    (c) after the reaction in (b) has begun but before the reaction has been 20% completed, continuously introducing the low molecular weight polyol having at least 2 hydroxyl groups and a molecular weight of less than 250 Da into the reactor, and
    (d) after the in situ made polyether polyol product having the desired molecular weight has been formed, removing that in situ made polyether polyol from the reactor,
    wherein the low molecular weight polyol having at least 2 hydroxyl groups is selected from the group consisting of propylene glycol, glycerin, sorbitol, sucrose, diglycerol, trimethylolpropane, pentaerythritol and mixtures thereof, and
    wherein the amount of low molecular weight polyol having at least 2 hydroxyl groups is about 1.2% to 3%, based on the final in situ made polyether product weight.

2. The process of claim 1 in which the hydroxyl group-containing vegetable oil is selected from the group consisting of castor oil, cashew nutshell oil, lesquerella oil, hydroxylated soybean oil, hydroxylated palm oil, hydroxylated sunflower oil, hydroxylated canola oil, hydroxylated linseed oil, hydroxylated cottonseed oil, hydroxylated tung oil, hydroxylated poppy seed oil, hydroxylated corn oil and hydroxylated peanut oil.

3. The process of claim 1 in which the hydroxyl group-containing vegetable oil is castor oil.

4. The process of claim 1 in which the hydroxyl group-containing vegetable oil is hydroxylated soybean oil.

5. The process of claim 1 in which the alkylene oxide is selected from the group consisting of ethylene oxide, propylene oxide, 1,2-butylene oxide, 2,3-butylene oxide, isobutylene oxide, epichlorohydrin, cyclohexene oxide, styrene oxide, $C_5$-$C_{30}$ α-alkylene oxides, polycarboxylic anhydrides, lactones and mixtures thereof.

6. The process of claim 1 in which the alkylene oxide is a mixture of propylene oxide and ethylene oxide.

7. The process of claim 1 in which the catalyst used in (a) is a DMC catalyst.

8. The process of claim 1 in which the low molecular weight polyol having at least 2 hydroxyl groups is glycerin.

9. The process of claim 1 in which the introduction of the low molecular weight polyol having at least 2 hydroxyl groups is begun after the reaction of alkylene oxide and the vegetable oil has proceeded to 1-20% completion.

10. The process of claim 1 in which the vegetable oil and the polyol having at least two hydroxyl groups are used in relative amounts such that from 5 to 95 mole equivalents of vegetable oil are reacted with from 5 to 95 mole equivalents of the low molecular weight polyol having at least 2 hydroxyl groups.

11. The process of claim 1 in which the hydroxyl group-containing vegetable oil is introduced into the reactor before the catalyst or the alkylene oxide.

12. The process of claim 1 in which the hydroxyl group-containing vegetable oil and the catalyst are combined prior to their introduction into the reactor and the alkylene oxide is then introduced into the reactor.

13. The process of claim 1 in which the hydroxyl group-containing vegetable oil, catalyst and alkylene oxide are each simultaneously introduced into the reactor on a continuous basis.

14. A process for the production of a polyurethane foam comprising reacting the polyether polyol of claim 1 with a polyisocyanate in the presence of a blowing agent at an NCO/OH index of from 80 to 125.

15. The foam produced by the process of claim 14.

* * * * *